US012626983B2

(12) United States Patent　　　(10) Patent No.:　US 12,626,983 B2
　　　Guan et al.　　　　　　　　　　(45) Date of Patent:　May 12, 2026

(54) BATTERY PACK AND ASSEMBLY METHOD OF BATTERY PACK

(71) Applicant: CALB Co., Ltd., Jiangsu (CN)

(72) Inventors: Junshan Guan, Changzhou (CN); Liangjie Gu, Changzhou (CN); Dong Zhao, Changzhou (CN); Zhijuan Cao, Changzhou (CN)

(73) Assignee: CALB Co., Ltd., Jiangsu (CN)

( * ) Notice: Subject to any disclaimer, the term of this patent is extended or adjusted under 35 U.S.C. 154(b) by 721 days.

(21) Appl. No.: 17/953,324

(22) Filed: Sep. 27, 2022

(65) Prior Publication Data

US 2024/0047800 A1　　Feb. 8, 2024

(30) Foreign Application Priority Data

Aug. 8, 2022　(CN) .......................... 202210946274.4

(51) Int. Cl.
　　*H01M 50/204*　　(2021.01)
　　*H01M 50/258*　　(2021.01)
　　*H01M 50/505*　　(2021.01)
(52) U.S. Cl.
　　CPC ....... *H01M 50/204* (2021.01); *H01M 50/258* (2021.01); *H01M 50/505* (2021.01)
(58) Field of Classification Search
　　CPC ............. H01M 50/204; H01M 50/258; H01M 50/505; H01M 50/507; H01M 50/553; H01M 50/502
　　See application file for complete search history.

(56) References Cited

U.S. PATENT DOCUMENTS

2018/0212214 A1　　7/2018　Sakai et al.

FOREIGN PATENT DOCUMENTS

| CN | 215418325 | | 1/2022 | | |
| CN | 216850226 | | 6/2022 | | |
| CN | 217881795 | | 11/2022 | | |
| EP | 3855558 | | 7/2021 | | |
| EP | 3855558 | A1 * | 7/2021 | .......... | H01M 50/593 |
| KR | 102110513 | | 5/2020 | | |

OTHER PUBLICATIONS

"Office Action of Europe Counterpart Application", issued on Jan. 26, 2024, p. 1-p. 7.
"Examination Report of India Counterpart Application", issued on Mar. 2, 2026, p. 1-p. 7.
"Office Action of China Counterpart Application", issued on Aug. 30, 2025, p. 1-p. 7.

* cited by examiner

*Primary Examiner* — Tong Guo
*Assistant Examiner* — Albert Michael Hilton
(74) *Attorney, Agent, or Firm* — JCIP GLOBAL INC.

(57)　　　　　ABSTRACT

Provided are a battery pack and a method for assembling the battery pack. The battery pack includes a battery string and a busbar support. The battery string includes a plurality of batteries arranged along a first direction. Surface of the battery perpendicular to the first direction is provided with a pole assembly. The busbar support is arranged on a surface of the battery parallel to the first direction. The busbar support includes a main body portion and a protection portion. The main body portion is configured for setting the busbar. The protection portion is connected to one side of the main body portion. The protection portion is located on one side of the pole assembly facing away from the battery along the first direction.

39 Claims, 18 Drawing Sheets

BATTERY PACK AND ASSEMBLY METHOD OF BATTERY PACK

CROSS-REFERENCE TO RELATED APPLICATION

This application claims the priority benefit of China application serial no. 202210946274.4, filed on Aug. 8, 2022. The entirety of the above-mentioned patent application is hereby incorporated by reference herein and made a part of this specification.

BACKGROUND

Technical Field

The present disclosure relates to the technical field of batteries, in particular to a battery pack and an assembly method for the battery pack.

Description of Related Art

For welding the busbar of the existing battery pack and the pole assembly of the battery, it is necessary to ensure the precise assembly positioning between the two. In the related art, supports are normally arranged on the lateral surface of the battery for the busbar to be arranged, so as to ensure assembly positioning between the busbar and the pole assembly. However, the pole assembly, as a component disposed on the surface of the battery, is very likely to be damaged by collision and squeezing of other structures during assembly or use, and the supports for existing busbar cannot provide protection for the pole assembly.

SUMMARY

In an aspect of the present disclosure, a battery pack is provided, which includes a battery string and a busbar support. The battery string includes a plurality of batteries arranged along a first direction. A surface of the battery perpendicular to the first direction is provided with a pole assembly. The busbar support is arranged on a surface of the battery parallel to the first direction. The busbar support includes a main body portion and a protection portion. The main body portion is configured for setting the busbar. The protection portion is connected to one side of the main body portion. The protection portion is located on one side of the pole assembly facing away from the battery along the first direction, so as to provide protection for the pole assembly.

In another aspect of the present disclosure, an assembly method for a battery pack is provided, which is used for assembling a battery and the busbar support provided by the present disclosure, including: fixing the busbar support with a tool; placing the battery from top to bottom, so that the lower end of the pole assembly of the battery is engaged between the first protrusion and the main body portion.

In yet another aspect of the present disclosure, an assembly method for a battery pack is provided, which is used for assembling the battery and the busbar support provided by the present disclosure, including: fixing the plurality of batteries into the battery string by using a tool; arranging the busbar to the lateral surface of the battery string.

BRIEF DESCRIPTION OF THE DRAWINGS

For a better understanding of the disclosure, reference may be made to exemplary embodiments shown in the following drawings. The components in the drawings are not necessarily to scale and related elements may be omitted, or in some instances proportions may have been exaggerated, so as to emphasize and clearly illustrate the features described herein. In addition, related elements or components can be variously arranged, as known in the art. Further, in the drawings, like reference numerals designate same or like parts throughout the several views.

DESCRIPTION OF THE EMBODIMENTS

The technical solutions in the exemplary embodiments of the disclosure will be described clearly and explicitly in conjunction with the drawings in the exemplary embodiments of the disclosure. The description proposed herein is just the exemplary embodiments for the purpose of illustrations only, not intended to limit the scope of the disclosure, so it should be understood that and various modifications and variations could be made thereto without departing from the scope of the disclosure.

In the description of the present disclosure, unless otherwise specifically defined and limited, the terms "first", "second" and the like are only used for illustrative purposes and are not to be construed as expressing or implying a relative importance. The term "plurality" is two or more. The term "and/or" includes any and all combinations of one or more of the associated listed items.

In particular, a reference to "the" object or "a" and "an" object is intended to denote also one of a possible plurality of such objects. Unless otherwise defined or described, the terms "connect", "fix" should be broadly interpreted, for example, the term "connect" can be "fixedly connect", "detachably connect", "integrally connect", "electrically connect" or "signal connect". The term "connect" also can be "directly connect" or "indirectly connect via a medium". For the persons skilled in the art, the specific meanings of the abovementioned terms in the present disclosure can be understood according to the specific situation.

Further, in the description of the present disclosure, it should be understood that spatially relative terms, such as "above", "below" "inside", "outside" and the like, are described based on orientations illustrated in the figures, but are not intended to limit the exemplary embodiments of the present disclosure.

In the context, it should also be understood that when an element or features is provided "outside" or "inside" of another element(s), it can be directly provided "outside" or "inside" of the other element, or be indirectly provided "outside" or "inside" of the another element(s) by an intermediate element.

Figure 1:
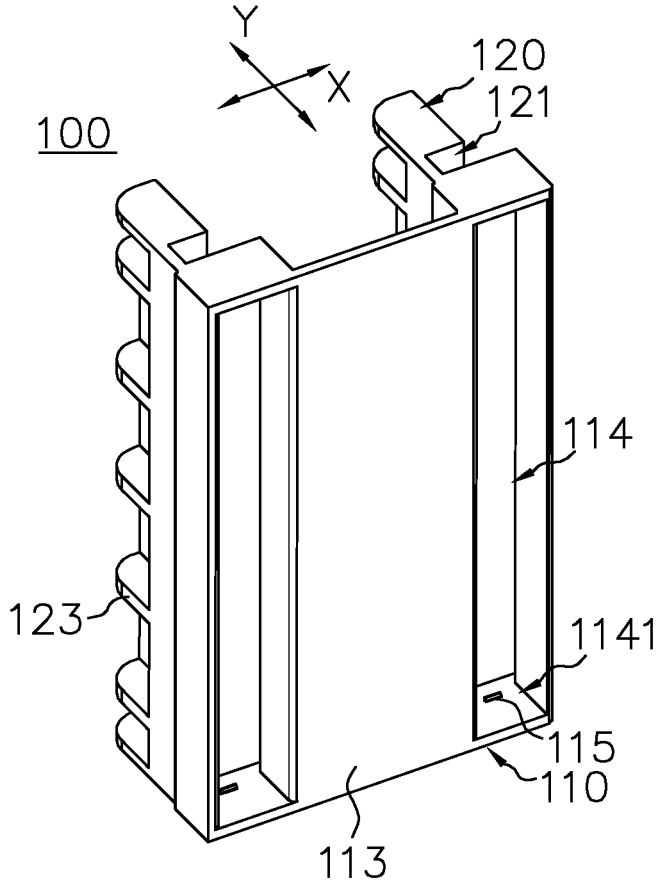
FIG. 1 is a perspective structural view of a busbar support of a battery pack according to an exemplary embodiment.

Referring to FIG. 1, FIG. 1 schematically shows a perspective structural view of the busbar support 100 of the battery pack provided by the present disclosure. In this exemplary embodiment, the battery pack provided by the present disclosure is described by taking a battery pack applied to a vehicle-mounted battery as an example. It is easily understood by those skilled in the art that, in order to apply the related designs of the present disclosure to other types of battery packs, various modifications, additions, substitutions, deletions or other changes may be made to the following specific embodiments. Variations are still within the scope of the principles of the battery pack provided by the present disclosure.

Figure 2:
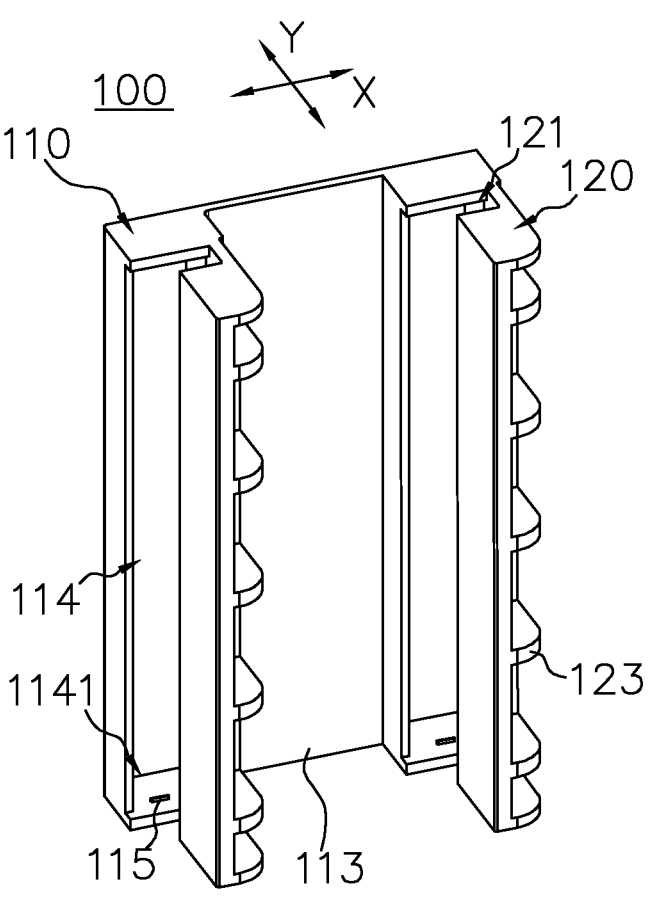
FIG. 2 is a perspective structural view of the busbar shown in FIG. 1 from another angle.
Figure 3:
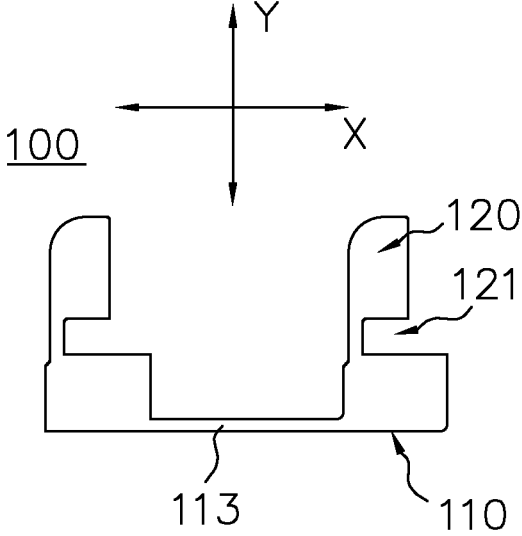
FIG. 3 is a top view of the busbar support shown in FIG. 1.
Figure 6:
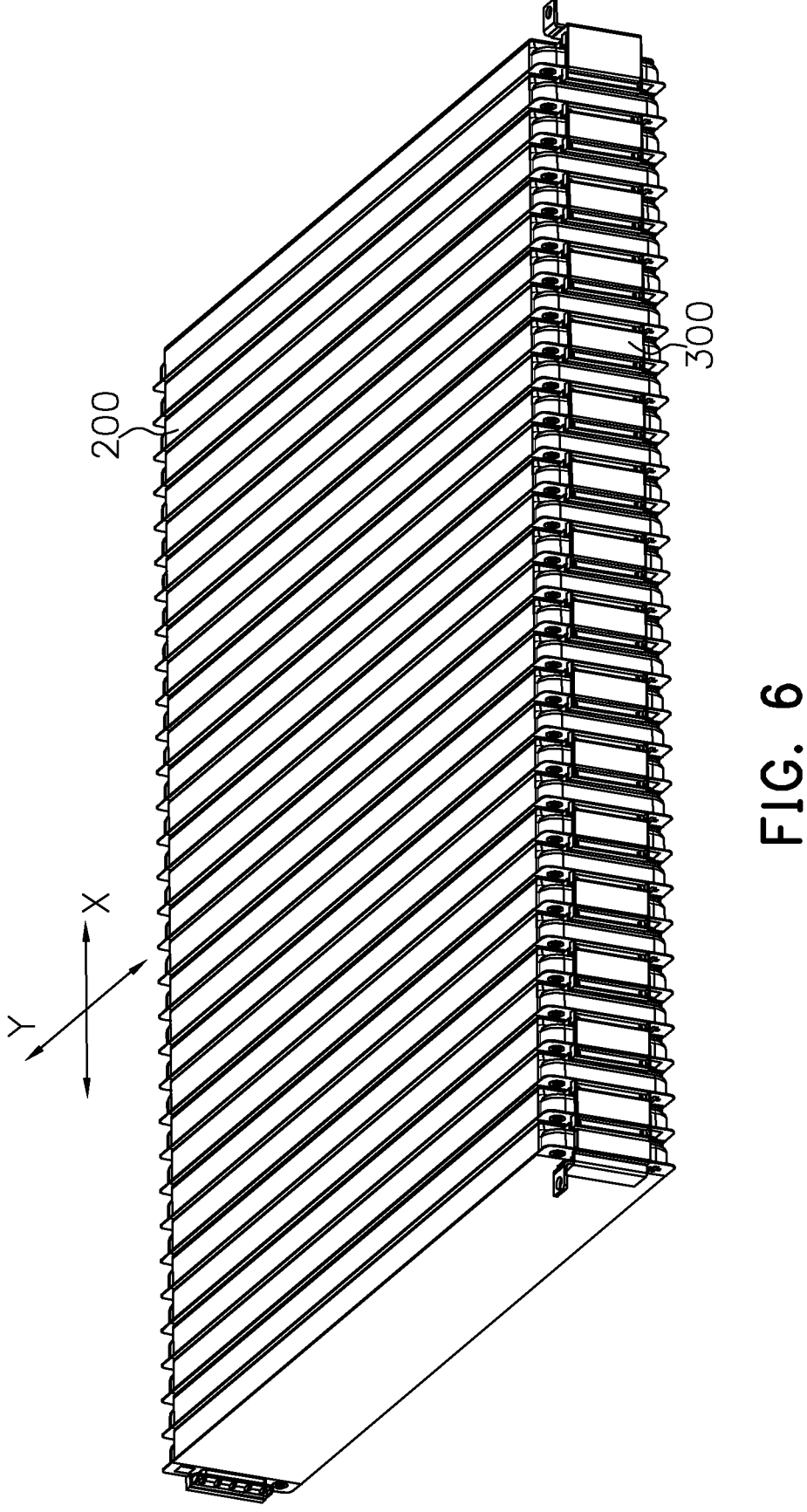
FIG. 6 is a perspective structural view of a battery pack according to an exemplary embodiment.

Referring to FIG. 6, FIG. 6 is a perspective structural view of a battery pack according to an exemplary embodiment, that is, the three-dimensional structure of the busbar support 100 shown in FIG. 1 when being assembled on the lateral surface of the batteries 200. In an embodiment of the present disclosure, the battery pack provided by the present disclosure includes a battery string and a busbar support 100. The battery string includes a plurality of batteries 200 arranged along the first direction X. A surface of the batteries 200 perpendicular to the first direction X is provided with a pole assembly. The busbar support 100 is arranged on a surface of the batteries 200 parallel to the first direction X. Referring to FIG. 2 and FIG. 3, FIG. 2 schematically shows a perspective structural view of the busbar support 100 from another angle capable of embodying the principle of the present disclosure. FIG. 2 schematically illustrates the top view of the busbar support 100 capable of embodying the principle of the present disclosure. The structure, connection manner and functional relationship of each main component of the battery pack provided by the present disclosure will be described in detail below with reference to the above drawings.

As shown in FIG. 1 to FIG. 3, in an embodiment of the present disclosure, the busbar support 100 includes a main body portion 110 and a protection portion 120. Specifically, the main body portion 110 is configured for arranging the busbar 300. The protection portion 120 is connected to one side of the main body portion 110. Accordingly, referring to FIG. 6 to FIG. 9, when the busbar support 100 is arranged on the lateral surface of the batteries 200, the protection portion 120 is located on one side of the pole assembly 210 facing away from the batteries 200 along the first direction X, so as to provide protection for the pole assembly 210. Through the above design, the present disclosure may utilize the protection portion 120 to provide protection for the pole assembly 210 of the batteries 200 while the busbar 300 is fixed, which facilitates to improve the stability and reliability of the battery pack.

Figure 7:
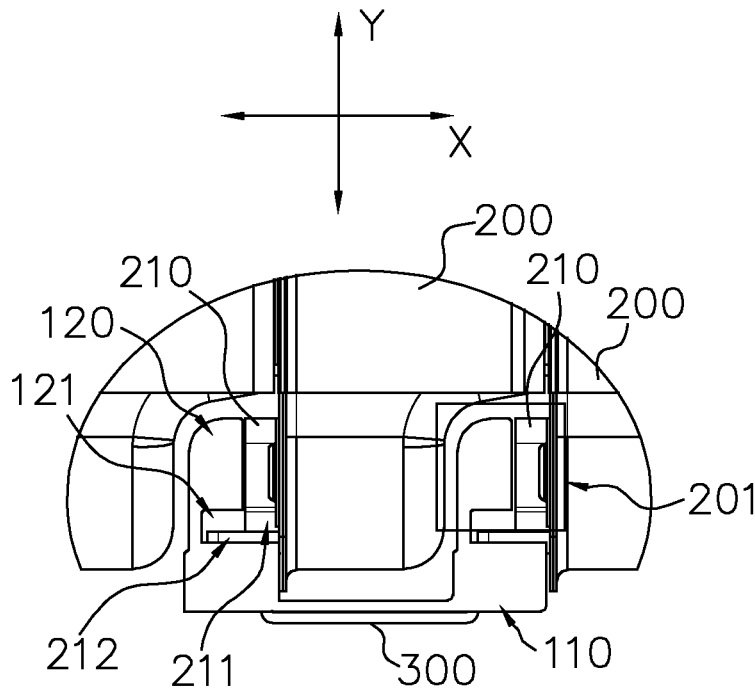
FIG. 7 is a partial top view of the battery pack shown in FIG. 6.
Figure 8:
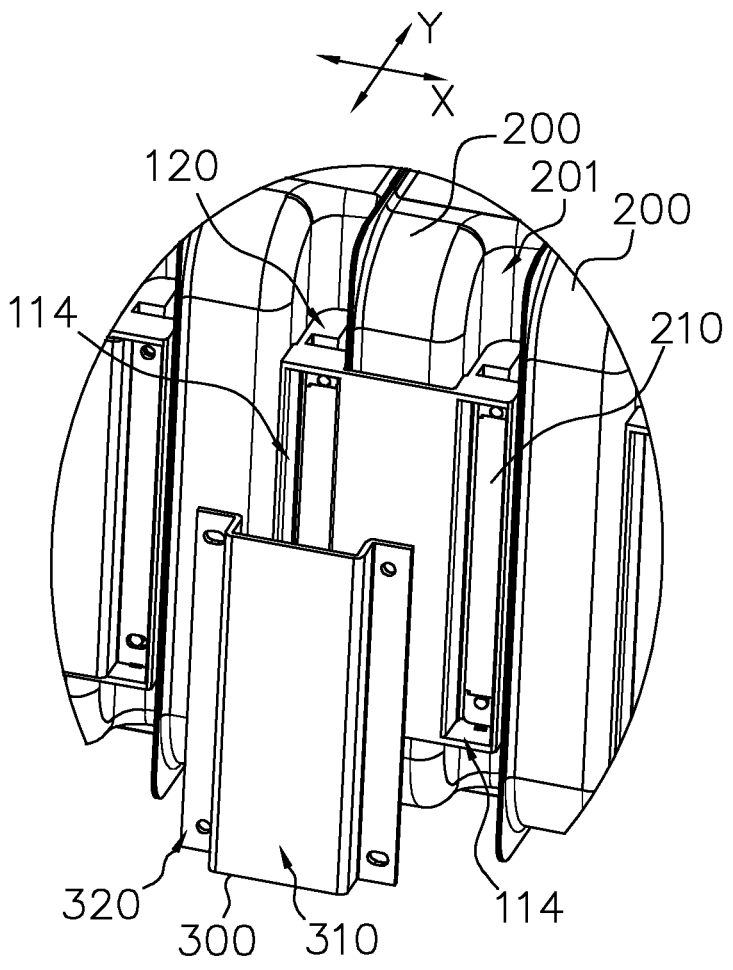
FIG. 8 is a partial perspective exploded view of the battery pack shown in FIG. 6.

As shown in FIG. 7 and FIG. 8, in an embodiment of the present disclosure, a surface of the batteries 200 perpendicular to the first direction X is the first surface. On this basis, the protection portion 120 of the busbar support 100 is located between two first surfaces of two adjacent batteries 200 facing each other. Through the above-mentioned structural design, the protection portion 120 may provide protection for the pole assembly 210 of one of the batteries 200 facing one side of the other of the batteries 200.

As shown in FIG. 7, in an embodiment of the present disclosure, the pole assembly 210 has a first portion 211 and a second portion 212. Specifically, the first portion 211 is disposed on a surface of the batteries 200 perpendicular to the first direction X, and the first portion 211 is used for connecting with the tabs of the batteries 200. The second portion 212 is connected to the first portion 211 and extends along the first direction X for connecting the busbar 300. On this basis, the protection portion 120 of the busbar support 100 may be located on one side of the second portion 212 facing away from the batteries 200 along the first direction X, so as to provide protection for the second portion 212. In some embodiments, the protection portion 120 may also be located on one side of the first portion 211 facing away from the batteries 200 along the first direction X, and this embodiment should not be construed as a limitation to the disclosure.

As shown in FIG. 7 and FIG. 8, in an embodiment of the present disclosure, a recessed region 201 is formed on a surface of the battery string parallel to the first direction X, and the recessed region 201 is located between two adjacent batteries 200, and the pole assembly 210 of one of the batteries 200 is located in the recessed region 201. On this basis, the protection portion 120 may be accommodated in the recessed region 201 and located between the pole assembly 210 of one battery 200 and another adjacent battery 200.

As shown in FIG. 6 to FIG. 9, in an embodiment of the present disclosure, the battery string may include at least three batteries 200. On this basis, each busbar support 100 may be used to set one busbar 300, and each busbar support 100 may include two protection portions 120. The two protection portions 120 are arranged at intervals along the first direction X. Accordingly, the two protection portions 120 are respectively accommodated in the two adjacent recessed regions 201. Through the above design, the present disclosure may utilize one busbar support 100 to provide protection for the pole assemblies 210 of two batteries 200 at the same time.

As shown in FIG. 11 to FIG. 14, in an embodiment of the present disclosure, a battery string may include a plurality of batteries 200, and a plurality of recessed regions 201, one less than the plurality of batteries 200, are formed on the lateral surface of the battery string. On this basis, taking a busbar support 100 provided on one side of the battery pack shown in FIG. 11 as an example, the busbar support 100 includes a main body portion 110 and a plurality of protection portions 120. The busbar support 100 may be used to set a plurality of busbars 300, and the number of the protection portions 120 is the same as the number of the recessed regions 201. The multiple protection portions 120 are arranged at intervals along the first direction X, and the multiple protection portions 120 are respectively accommodated in the multiple recessed regions 201, so that the busbar support 100 is utilized to provide protection for the pole assemblies 210 of the multiple batteries 200 at the same time. In addition, taking a plurality of busbar supports 100 provided on one side of the battery pack shown in FIG. 6 as an example. Each busbar support 100 includes a main body portion 110 and two protection portions 120. Accordingly, the plurality of protection portions 120 are respectively accommodated in the plurality of recessed regions 201, so that one busbar support 100 is utilized to provide protection for the pole assemblies 210 of two batteries 200 at the same time.

Referring to FIG. 6 to FIG. 9, in an embodiment of the present disclosure, when the busbar support 100 is arranged on the lateral surface of the battery string, there is a gap G between the protection portion 120 and the batteries 200 on one side facing away from the pole assembly 210. With the above design, the present disclosure can facilitate the assembly of the busbar support 100 and the battery string through the gap G, and tolerances may be absorbed. In this manner, the busbar support 100 may be directly arranged on the lateral surface of the battery string, thereby saving time and effort, and having high assembly efficiency.

Figure 11:
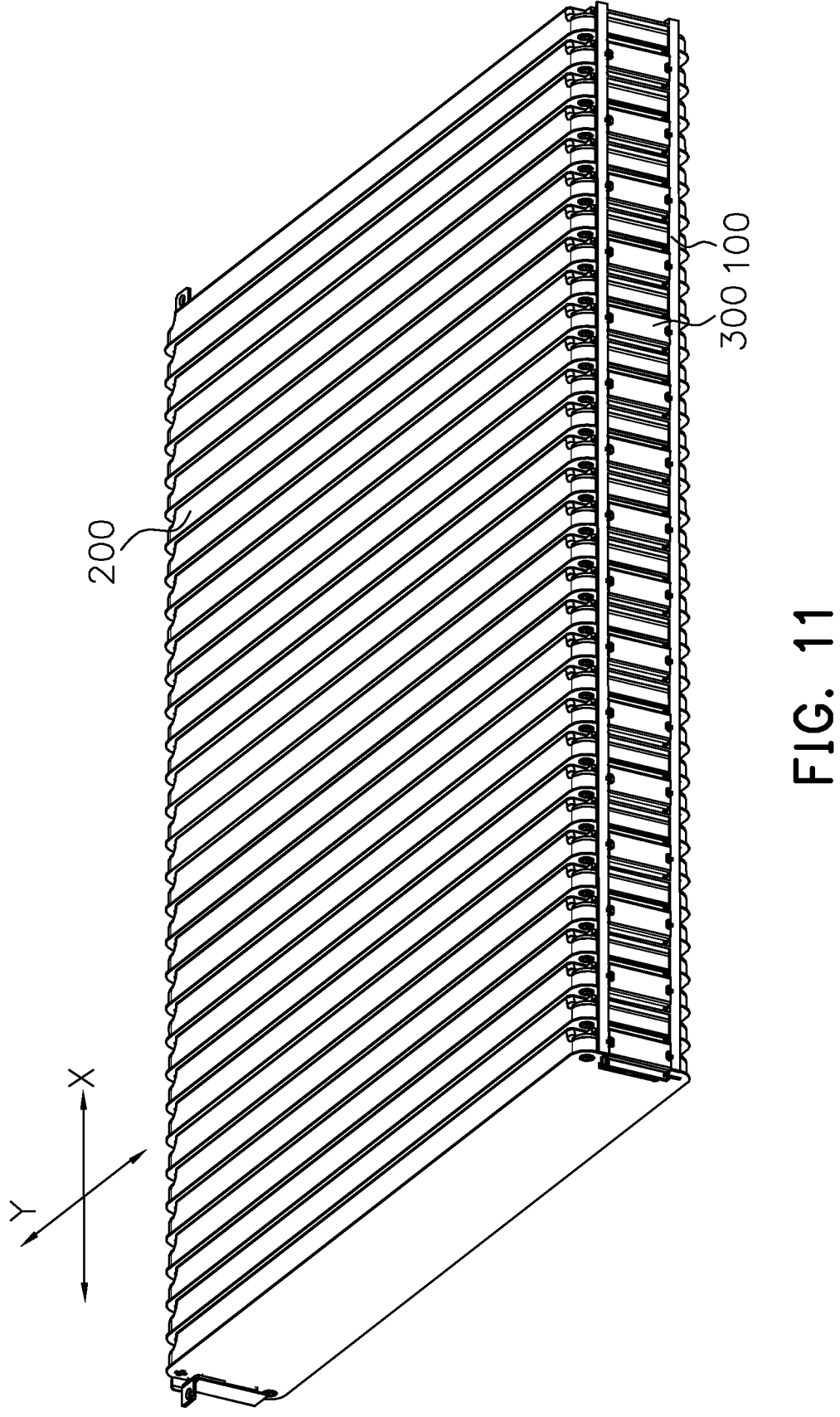
FIG. 11 is a perspective structural view of a battery pack according to another exemplary embodiment.
Figure 12:
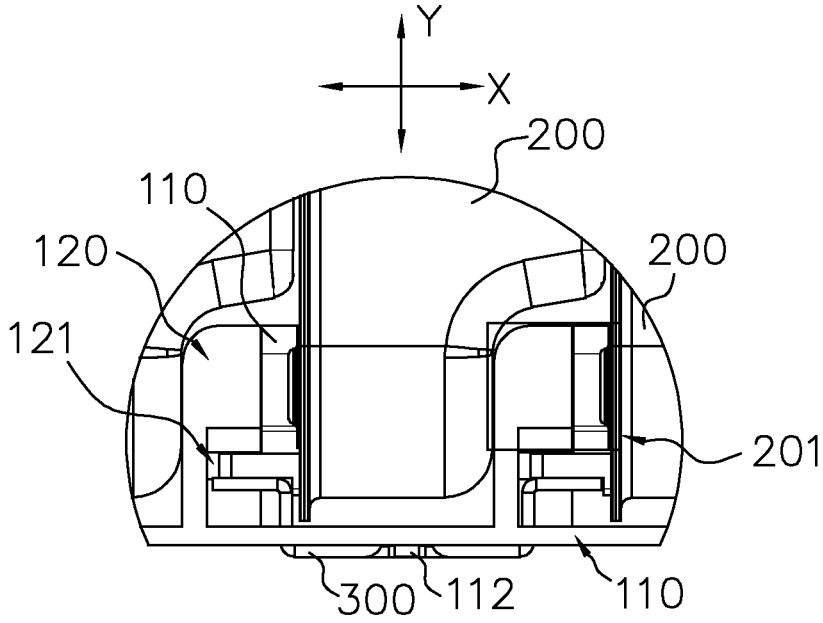
FIG. 12 is a partial top view of the battery pack shown in FIG. 11.
Figure 13:
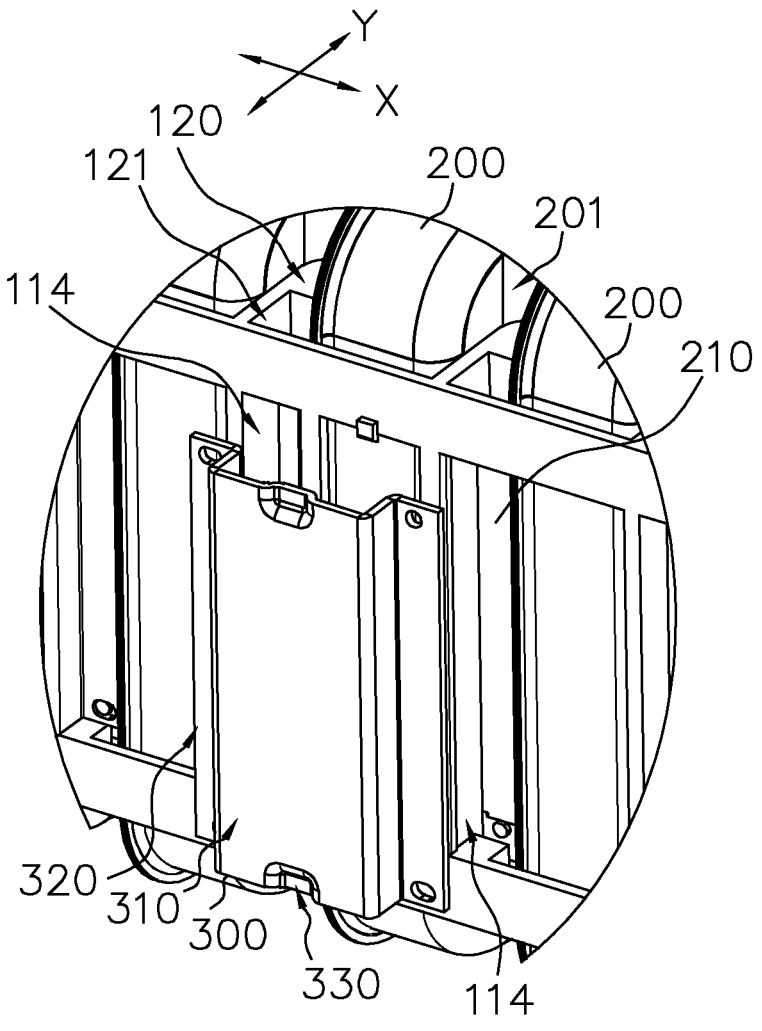
FIG. 13 is a partial perspective exploded view of the battery pack shown in FIG. 11.

As shown in FIG. 11 to FIG. 13, in an embodiment of the present disclosure, at least four recessed regions 201 are provided on one side of the battery string, and at least one busbar support 100 is provided on one lateral surface of the battery string. On this basis, the main body portion 110 is used to set at least two busbars 300, and the busbar support 100 includes at least four protection portions 120, and the at least four protection portions 120 are respectively accommodated in the at least four recessed regions 201.

As shown in FIG. 6 to FIG. 8, in an embodiment of the present disclosure, one side of the battery string is provided with at least four recessed regions 201, and one lateral surface of the battery string is provided with at least two busbar supports 100. For each busbar support 100, the main body portion 110 thereof is used to set one busbar 300, and there are two protection portions 120, and the two protection portions 120 are respectively accommodated in two adjacent recessed regions 201.

As shown in FIG. 7 or FIG. 12, in an embodiment of the present disclosure, at least a part of the recessed region 201 may be substantially arc-shaped. On this basis, one side of the protection portion 120 of the busbar support 100 facing away from the pole assembly 210 may be substantially in an arc shape corresponding to the shape of the partial area of the recessed region 201.

As shown in FIG. 2, in an embodiment of the present disclosure, a surface of the protection portion 120 facing away from the pole assembly 210 may be provided with a reinforcing rib 123. One side of the reinforcing rib 123 facing away from the pole assembly 210 is in an arc shape corresponding to the shape of the partial area of the recessed region 201. Through the above design, the present disclosure may strengthen the structural strength of the protection portion 120 while arranging the protection portion 120. In addition, when the protection portion 120 adopts a structure with grooves 121, the disposition of the reinforcing rib 123 may prevent the protection portion 120 from being designed as a solid structure, so as to enhance the structural strength and reduce the weight of the busbar support 100 at the same time.

As shown in FIG. 1 to FIG. 3, in an embodiment of the present disclosure, the busbar support 100 may be provided with a groove 121, and the groove 121 may be jointly formed by the main body portion 110 and the protection portion 120. The groove 121 is used to accommodate at least part of the structure of the pole assembly 210 of the batteries 200 (such as the second portion 212 of the pole assembly 210) and the part of the busbar 300 for connecting with the pole assembly 210 (such as the connection portion 320). The size of the groove 121 is larger than the size of the pole assembly 210 (the part accommodated by the groove 121). Through the above design, the present disclosure allows the protection portion 120 to facilitate the pole assembly 210 to pass through and be accommodated by the groove 121, and facilitate to accommodate and avoid the pole assembly 210 (for example, but not limited to the L-shaped pole assembly 210 shown in the figure), thereby further enhancing the protection effect for the pole assembly 210.

As shown in FIG. 7 or FIG. 12, in an embodiment of the present disclosure, the notch of the groove 121 may be opened toward the pole assembly 210 along the first direction X, so that the pole assembly 210 can enter the groove 121 through the notch.

Figure 15:
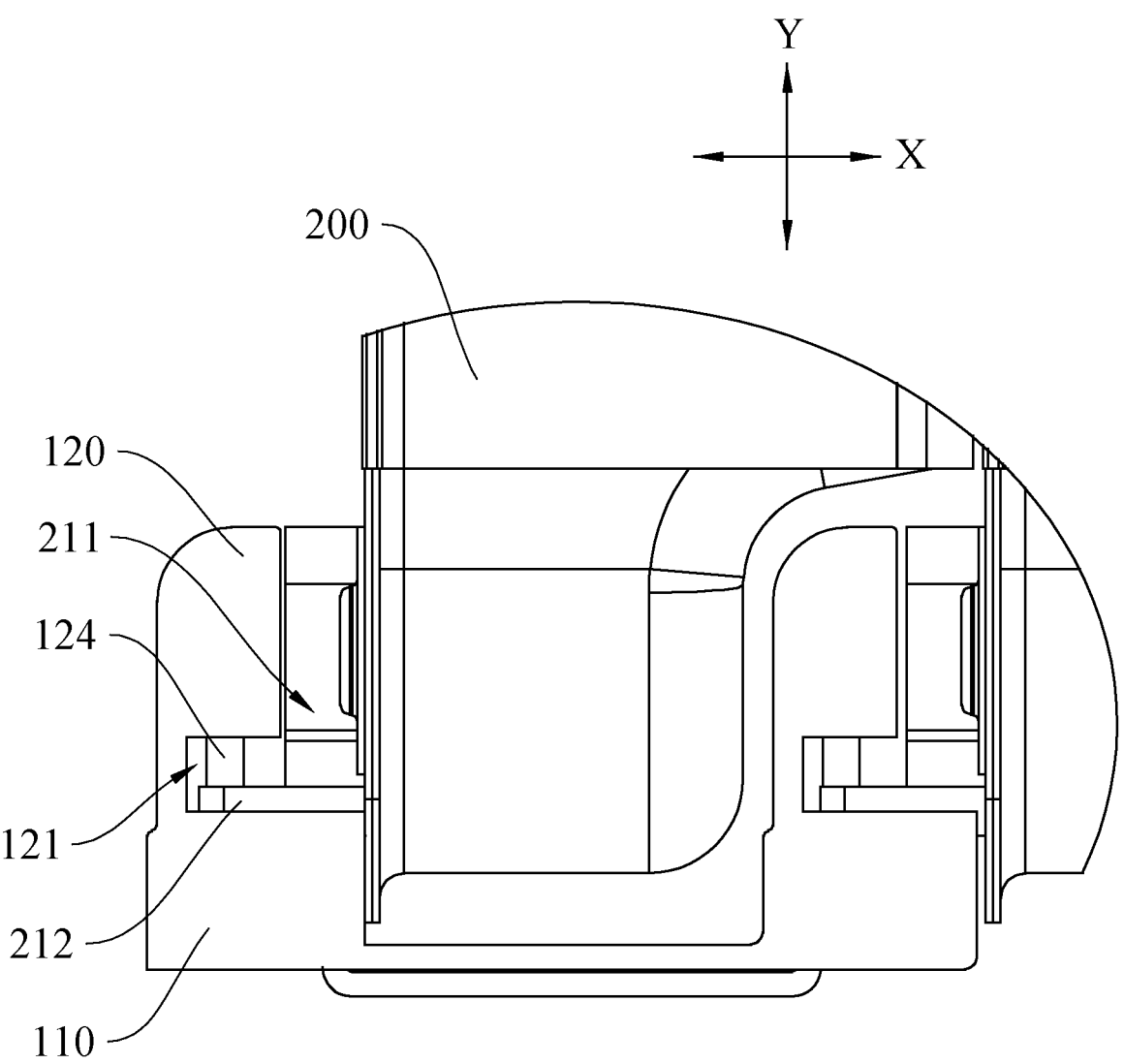
FIG. 15 is a partial top view of a battery pack shown in another exemplary embodiment.
Figure 16:
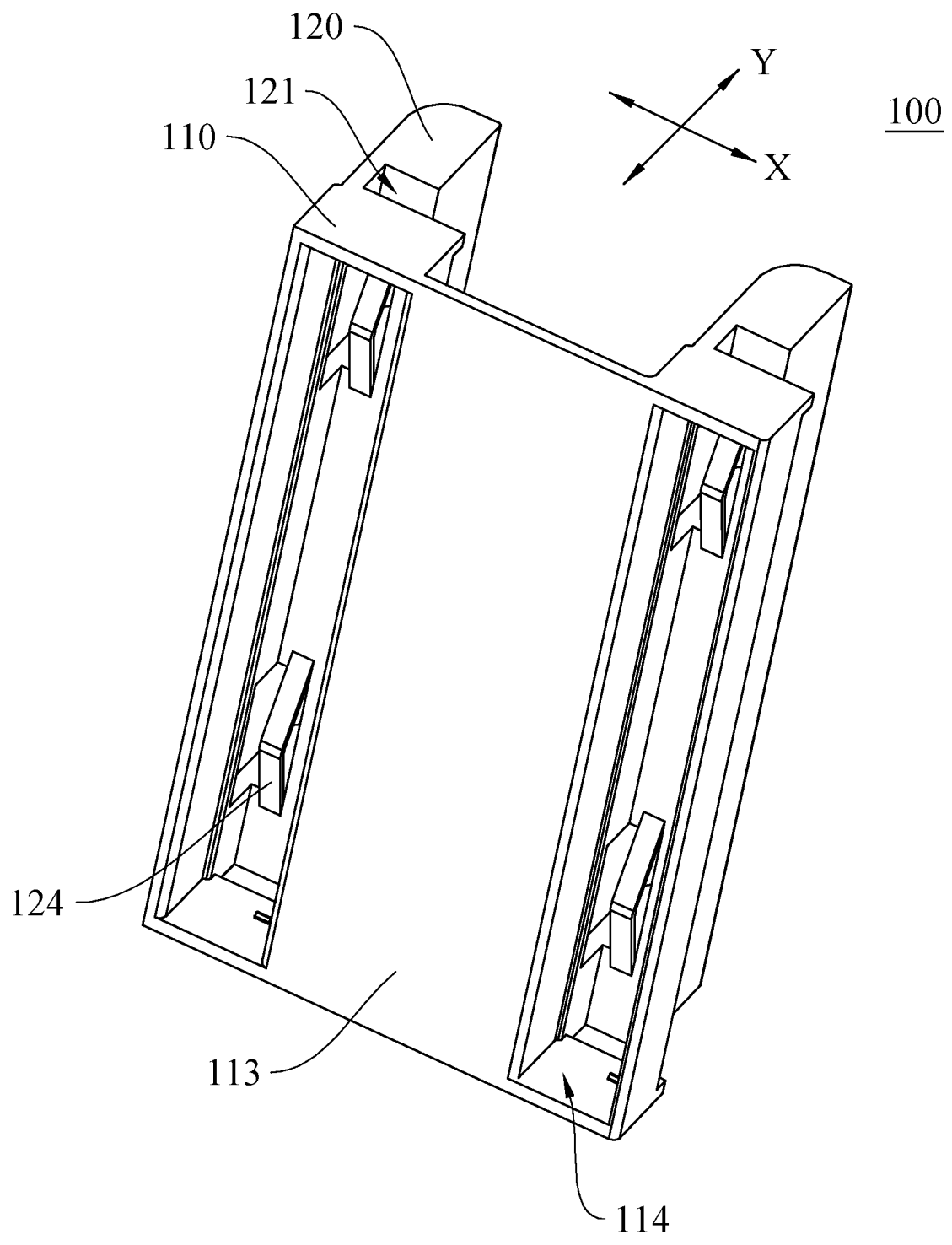
FIG. 16 is a perspective structural view of the busbar support of the battery pack shown in FIG. 15.

Referring to FIG. 15 and FIG. 16, FIG. 15 schematically shows a partial top view of a battery pack capable of embodying the principles of the present disclosure in another exemplary embodiment; FIG. 16 schematically shows the three-dimensional structure of the busbar support of the battery pack shown in FIG. 15.

As shown in FIG. 15 and FIG. 16, in an embodiment of the present disclosure, the groove 121 has a first groove wall and a second groove wall spaced apart along a second direction Y, and the second direction Y is perpendicular to the above-mentioned first direction X. The first groove wall is located on a surface of the main body portion 110 facing the batteries 200, and the second groove wall is located on the protection portion 120. On this basis, the second groove wall is provided with a first elastic member 124 extending toward the first groove wall, and the pole assembly 210 is sandwiched between the first elastic member 124 and the first groove wall. The first elastic member 124 is configured for providing an elastic preload force to the pole assembly 210. Through the above design, the present disclosure allows the fixation of the busbar support 100 and the pole assembly 210 more firm, facilitates arrangement and positioning, and has higher assembly efficiency.

As shown in FIG. 16, based on the design that the groove wall of the groove 121 is provided with the first elastic member 124, in an embodiment of the present disclosure, the upper and lower sides of the first elastic member 124 may be provided with a guiding structure, such as the inclined surface structure and the like shown in the drawings. The guiding structure is configured for guiding the pole assembly 210 when the battery pack and the busbar support 100 move up and down relative to each other so that the pole assembly 210 enters the groove 121. Through the above structural design, the present disclosure may further facilitate arrangement, which helps to improve assembly efficiency. In addition, in some embodiments, according to different assembly requirements, the first elastic member 124 may also be provided with a guiding structure only on the upper side or the lower side thereof, and this embodiment should not be construed as a limitation to the disclosure.

As shown in FIG. 16, based on the design that the groove wall of the groove 121 is provided with the first elastic member 124, in an embodiment of the present disclosure, the second groove wall may be provided with at least two first elastic members 124, and the first elastic members 124 are arranged at intervals. Through the above design, the present disclosure may further improve assembly stability.

Based on the design that the groove wall of the groove 121 is provided with the first elastic member 124, in an embodiment of the present disclosure, the first elastic member 124 may be a spring or an elastic sheet.

As shown in FIG. 16, based on the design that the groove wall of the groove 121 is provided with the first elastic member 124, in an embodiment of the present disclosure, the first elastic member 124 and the protection portion 120 may be integrally formed.

Based on the design that the groove wall of the groove 121 is provided with the first elastic member 124, in an embodiment of the present disclosure, the pole assembly 210 may be provided with a position-limiting member, which is used to limit the position of the first elastic member 124. Through the above design, the present disclosure may further improve the precision and stability of assembly.

Based on the design that the first elastic member 124 is disposed on the groove wall of the groove 121, in an embodiment of the present disclosure, an insulating adhesive layer is disposed on a surface of the pole assembly 210, and the insulating adhesive layer may be opened to form an accommodating groove corresponding to the position of the first elastic member 124. The accommodating groove may be formed for accommodating the first elastic member 124. Through the above design, the present disclosure may utilize the opening design of the insulating adhesive layer to form the accommodating groove for positioning the first elastic member 124 when the insulating adhesive layer is disposed on a surface of the pole assembly.

Based on the design that the groove wall of the groove 121 is provided with the first elastic member 124, in an embodiment of the present disclosure, an insulating adhesive layer is provided on a surface of the pole assembly 210, and the insulating adhesive layer is provided with a position-limiting member. The position-limiting member is configured to limit the position of the first elastic member 124. Through the above design, the present disclosure may further improve the precision and stability of assembly.

Figure 19:
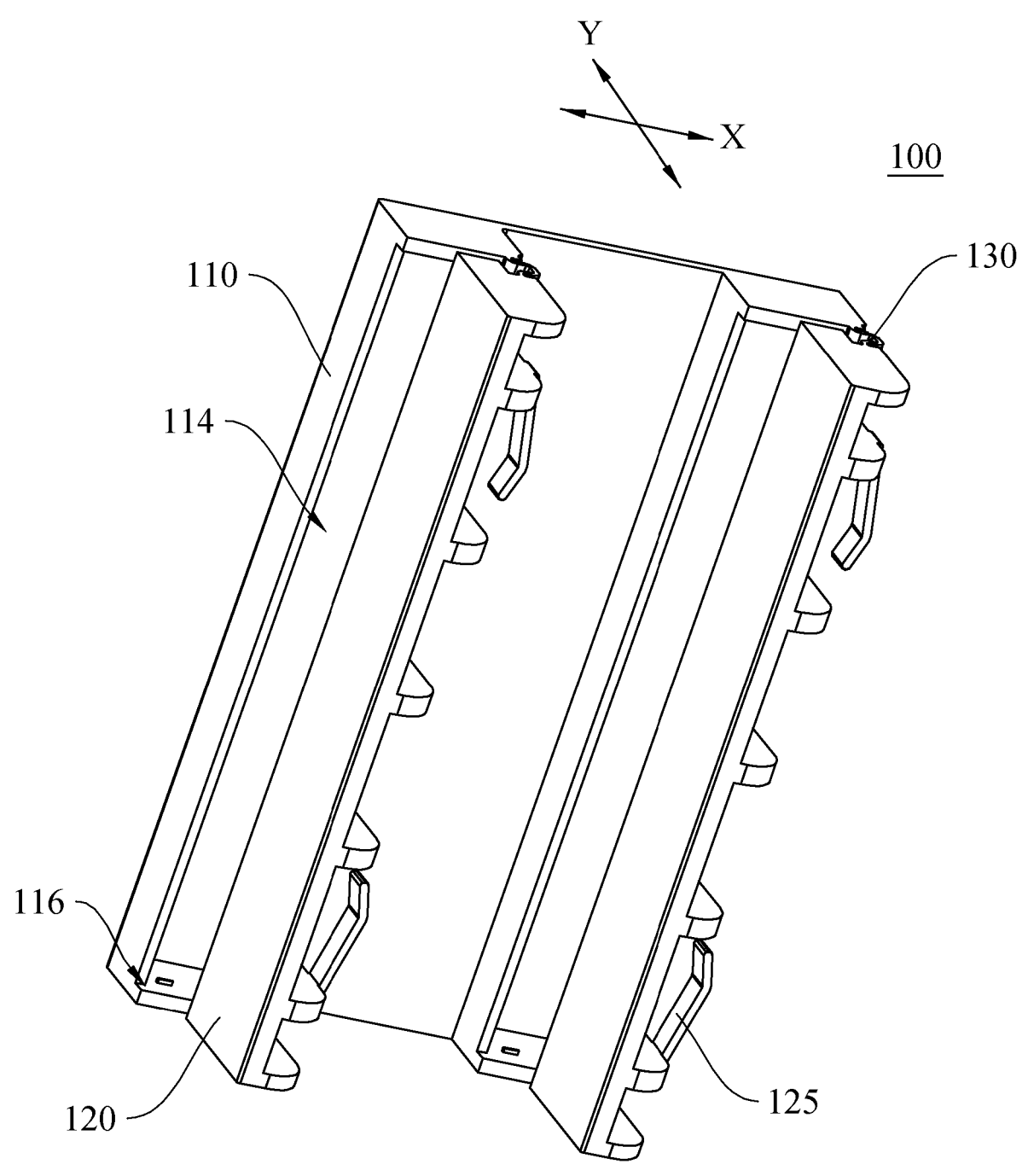
FIG. 19 is a schematic perspective view of the busbar support of the battery pack shown in FIG. 18.

Referring to FIG. 19, the structure shown in FIG. 16 substantially reflects the three-dimensional structure of the busbar support 100 shown in FIG. 16 from another angle. In an embodiment of the present disclosure, a surface of one side of the main body portion 110 facing the protection portion (i.e., the first groove wall of the groove 121) may be provided with a positioning groove 116, and the positioning groove 116 is used to accommodate and fasten part of the structure of the pole assembly (for example, the second portion 212 of the connection portion). Accordingly, the assembly process of the busbar support 100 and the battery pack 200 may include: the busbar support 100 is assembled to the lateral surface of the battery pack 200 in the up-down direction, the pole assembly 210 enters the groove 121 during the above assembly process, and then the busbar support 100 is pushed toward the battery pack 200, so that part of the structure of the pole assembly 210 is engaged into the positioning groove 116.

Figure 17:
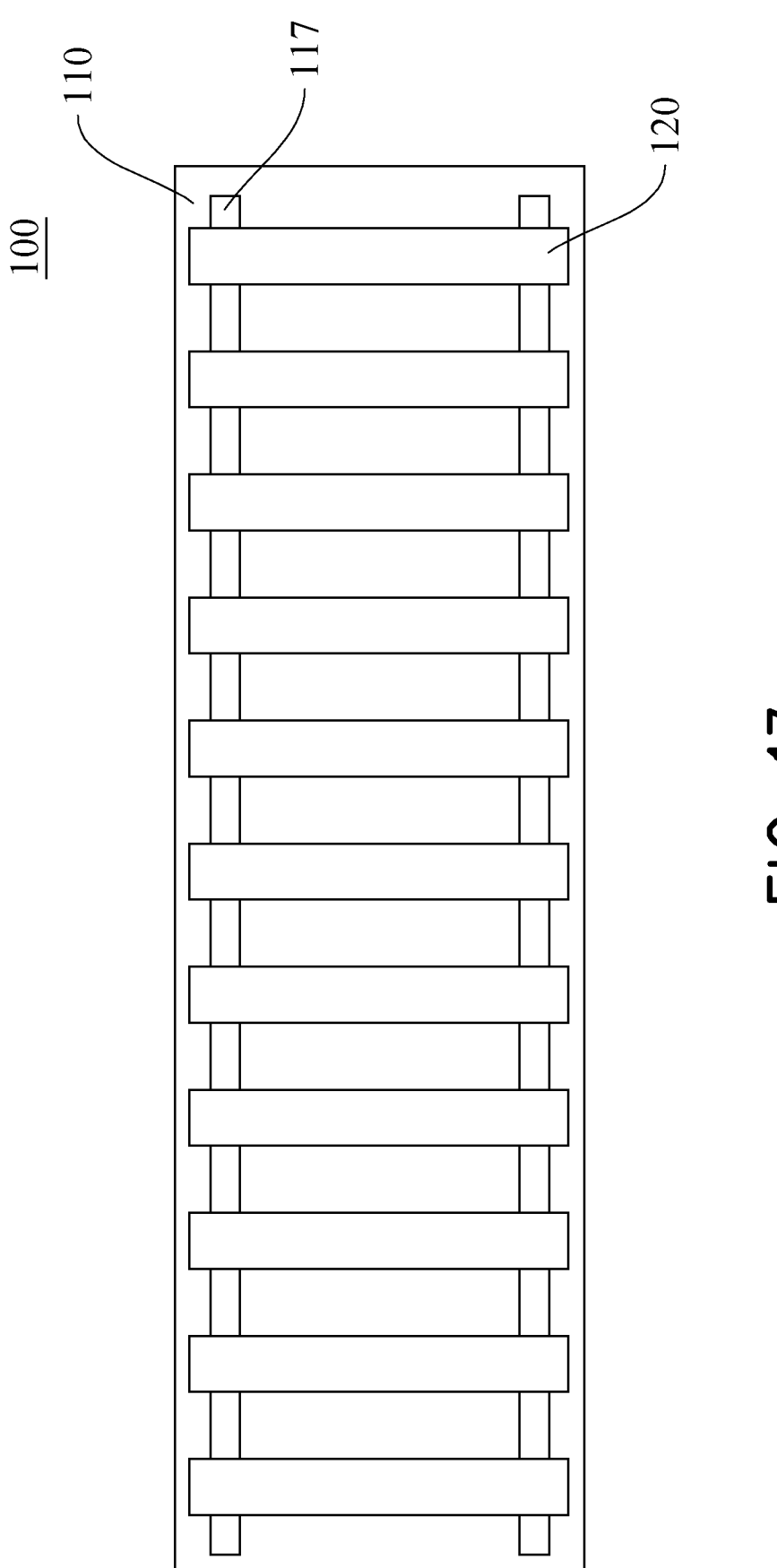
FIG. 17 is a schematic plan view of a busbar support of a battery pack according to another exemplary embodiment.

Referring to FIG. 17, FIG. 17 is a schematic plan view of a busbar support of a battery pack in another exemplary embodiment capable of embodying the principles of the present disclosure.

As shown in FIG. 17, in an embodiment of the present disclosure, the protection portion 120 is slidably disposed on the main body portion 110, and the sliding direction of the protection portion 120 may be the first direction X. Through the above design, the present disclosure facilitates to absorb assembly tolerances, facilitate configuration, and has high assembly efficiency.

As shown in FIG. 17, based on the design that the protection portion 120 is slidably disposed on the main body portion 110, in an embodiment of the present disclosure, a slide rail 117 may be provided on one side of the main body portion 110 facing the battery pack 200. Specifically, the slide rail 117 may be a slideway, a slide groove, a rail, etc., accordingly, the protection portion 120 is slidably cooperated with the slide rail 117. Through the above design, the present disclosure has the advantages of simple structure and easy implementation.

Figure 18:
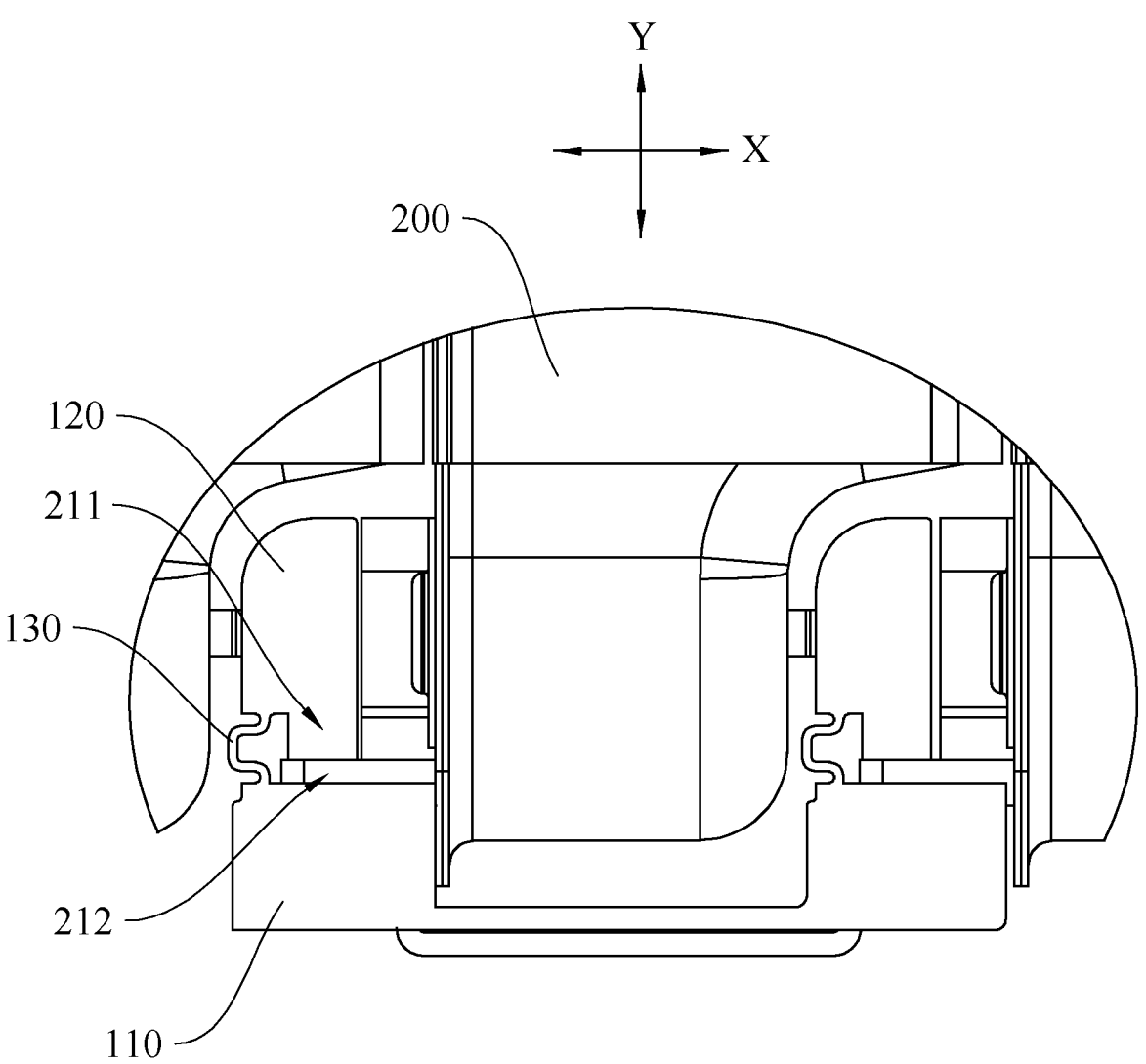
FIG. 18 is a partial top view of a battery pack shown in another exemplary embodiment.

Referring to FIG. 18 and FIG. 19, FIG. 18 schematically shows a partial top view of a battery pack 200 capable of embodying the principles of the present disclosure in another exemplary embodiment; FIG. 19 is a schematic view of a three-dimensional structure of the busbar support 100 of the battery pack 200 shown in FIG. 18.

As shown in FIG. 18, in an embodiment of the present disclosure, the busbar support 100 may further include a flexible structure 130, and the main body portion 110 and the protection portion 120 are connected through the flexible structure 130. Through the above design, the present disclosure may utilize the flexible structure 130 to absorb tolerances, facilitate configuration, and may also utilize the flexible structure 130 to provide a buffering effect on the welding portion of the busbar 300.

Based on the design of the busbar support 100 including the flexible structure 130, in an embodiment of the present disclosure, the main body portion 110, the protection portion 120 and the flexible structure 130 may be an integral structure. Through the above design, the present disclosure may further facilitate the processing, production and assembly of the busbar support 100, and helps to reduce the number of components.

Based on the design of the busbar support 100 including the flexible structure 130, in an embodiment of the present disclosure, the flexible structure 130 may have a degree of shaking freedom along the first direction X. Through the above design, the present disclosure may utilize the flexible structure 130 to realize absorption of the assembly tolerance of each battery of the battery pack 200, so as to facilitate the assembly of the busbar support 100 and the battery pack 200.

Based on the design of the busbar support 100 including the flexible structure 130, in an embodiment of the present disclosure, the flexible structure 130 may have a degree of shaking freedom along the second direction Y perpendicular to the first direction X. Through the above design, the present disclosure may further facilitate the arrangement of the busbar support 100.

As shown in FIG. 19, in an embodiment of the present disclosure, along the first direction X, one side of the protection portion 120 facing away from the pole assembly 210 may be provided with a second elastic member 125 facing the adjacent battery. Through the above-mentioned design, the present disclosure may utilize the second elastic member 125 to press against the adjacent battery, thereby meeting the requirement for positioning and fixing when there is a gap between one side of the protection portion 120 facing away from the pole assembly 210 and the adjacent battery, thereby preventing the protection portion 120 from shaking in the recessed region 201, and the gap provides an expansion space for the expansion of the battery. In some embodiments, the second elastic member 125 may also be disposed on one side of the protection portion 120 facing the pole assembly 210, that is, the second elastic member 125 abuts against a surface of the battery to which the pole assembly 210 belongs, and this embodiment should not be construed as a limitation to the disclosure.

As shown in FIG. 19, based on the design that the protection portion 120 is provided with the second elastic member 125, in an embodiment of the present disclosure, the second elastic member 125 may be a cantilever structure, and the connection end of the cantilever structure is connected to the protection portion 120, the free end of the cantilever structure abuts against the adjacent battery.

As shown in FIG. 19, based on the design that the protection portion 120 is provided with the second elastic member 125, in an embodiment of the present disclosure, the second elastic member 125 and the protection portion 120 may be integrally formed.

In an embodiment of the present disclosure, the protection portion 120 may be connected to the main body portion 110 in a detachable manner. Through the above design, the present disclosure allows replacement when the protection portion 120 is damaged, avoiding the need to replace the whole busbar support 100 due to the damage of an individual protection portion 120, thereby saving costs.

Figure 4:
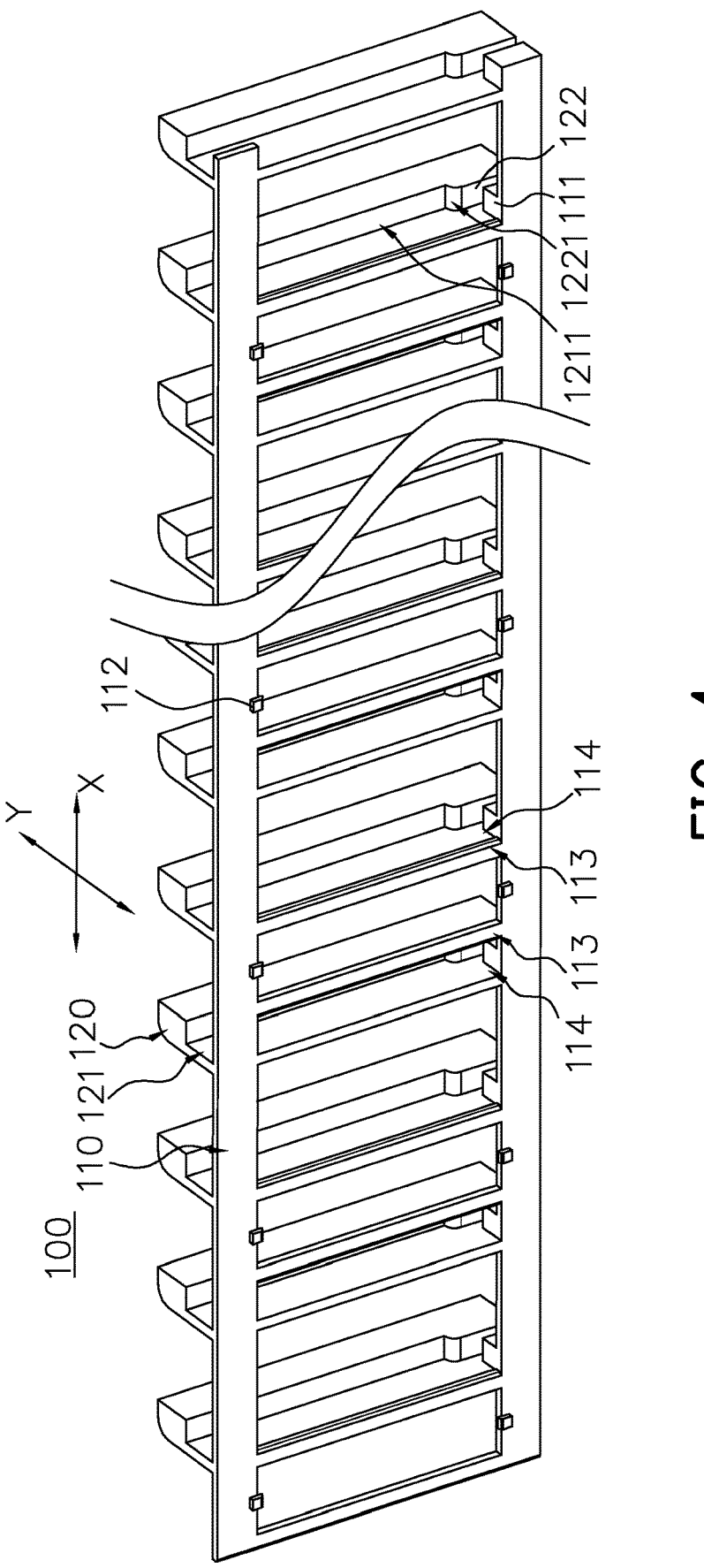
FIG. 4 is a perspective structural view of a busbar support of a battery pack according to another exemplary embodiment.
Figure 5:
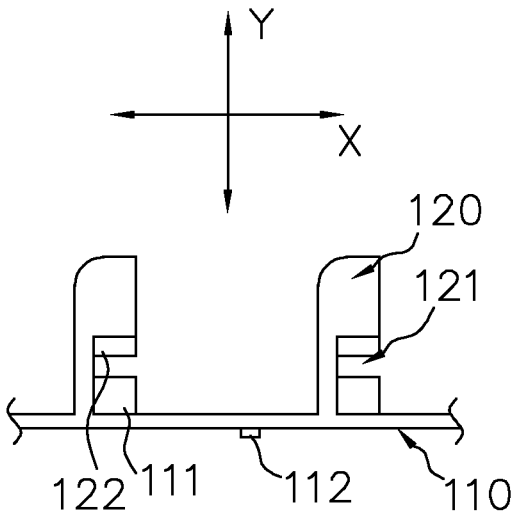
FIG. 5 is a partial top view of the busbar support shown in FIG. 4.

As shown in FIG. 4 and FIG. 5, based on the design that the protection portion 120 is provided with the groove 121, in an embodiment of the present disclosure, the lower end of the groove 121 facing the groove wall 1211 of the main body portion 110 may be provided with a first protrusion 122. The first protrusion 122 is spaced apart from the main body portion 110 along a second direction Y perpendicular to the first direction X. Accordingly, referring to FIG. 11 to FIG. 14, when the busbar support 100 is arranged on the lateral surface of the batteries 200, the lower end of the pole assembly 210 is engaged between the first protrusion 122 and the main body portion 110. Through the above design, the present disclosure may utilize the first protrusion 122 to cooperate with the main body portion 110 to realize the fixation of the pole assembly 210, thereby improving the assembly stability and assembly precision of the pole assembly 210.

As shown in FIG. 4, based on the design that the groove wall 1211 of the groove 121 is provided with the first protrusion 122, in an embodiment of the present disclosure, the upper end of the first protrusion 122 facing the main body portion 110 may be provided with a chamfer structure 1221. Through the above design, the present disclosure may utilize the chamfered structure 1221 of the first protrusion 122 to guide the pole assembly 210 during the assembly process of the busbar support 100 and the battery string, for example, during the process of loading the battery string into the busbar support 100 from top to bottom. In the meantime, the chamfered structure 1221 may be used to avoid damage to the pole assembly 210.

Based on the design that the groove wall 1211 of the groove 121 is provided with the first protrusion 122, in an embodiment of the present disclosure, the lower end of the first protrusion 122 may be connected to the main body portion 110 through an abutting portion (not shown in the drawings). Accordingly, when the busbar support 100 is arranged on the lateral surface of the batteries 200, the bottom surface of the pole assembly 210 may abut against the top surface of the abutting portion. Through the above design, the present disclosure may utilize the abutting portion (i.e., the connection between the main body portion 110 and the first protrusion 122) to realize the positioning of the pole assembly 210, and the pole assembly 210 is dislocated during the assembly process.

As shown in FIG. 4 and FIG. 5, based on the design that the groove wall 1211 of the groove 121 is provided with the first protrusion 122, in an embodiment of the present disclosure, the main body portion 110 may be provided with a second protrusion 111 protruding toward the first protrusion 122. The first protrusion 122 is arranged at intervals from the second protrusion 111. Accordingly, referring to FIG. 11 to FIG. 14, when the busbar support 100 is arranged on the lateral surface of the batteries 200, the lower end of the pole assembly 210 is engaged between the first protrusion 122 and the second protrusion 111. Through the above design, the present disclosure may utilize the cooperation of the first protrusion 122 and the second protrusion 111 to realize the fixation of the pole assembly 210, thereby further improving the assembly stability and assembly precision of the pole assembly 210.

Based on the design that the busbar support 100 has the groove 121, in an embodiment of the present disclosure, the main body portion 110 may be substantially frame-shaped and has an opening, and a position-limiting plate 113 is disposed in the opening. The position-limiting plate 113 occupies a part of the opening space, and the part of the opening not occupied by the position-limiting plate 113 forms a through hole 114, and the through hole 114 communicates with the groove 121. On this basis, when the busbar 300 is disposed on the busbar support 100, the main body 310 of the busbar 300 is located on one side of the position-limiting plate 113 facing away from the protection portion 120. The connection portion 320 of the busbar 300 passes through the through hole 114 and is connected to the pole assemblies 210 accommodated in the groove 121.

As shown in FIG. 4 and FIG. 5, in an embodiment of the present disclosure, the main body portion 110 may be provided with an engagement protrusion 112, and the main body portion 110 may be engaged with the busbar 300 through the engagement protrusion 112. For example, the engagement protrusion 112 may be disposed at intervals on one side of the position-limiting plate 113 of the main body portion 110 facing away from the batteries 200. Accordingly, when the busbar 300 is arranged on the busbar support 100, the main body 310 of the busbar 300 is limited between the position-limiting plate 113 and the engagement protrusion 112. Through the above design, the present disclosure may realize the fixing of the busbar 300 by using the engagement protrusion 112, thereby improving the assembly stability and assembly precision of the busbar 300. In some embodiments, the engagement protrusion 112 may also be disposed at other positions of the main body portion 110, and this embodiment should not be construed as a limitation to the disclosure.

Figure 14:
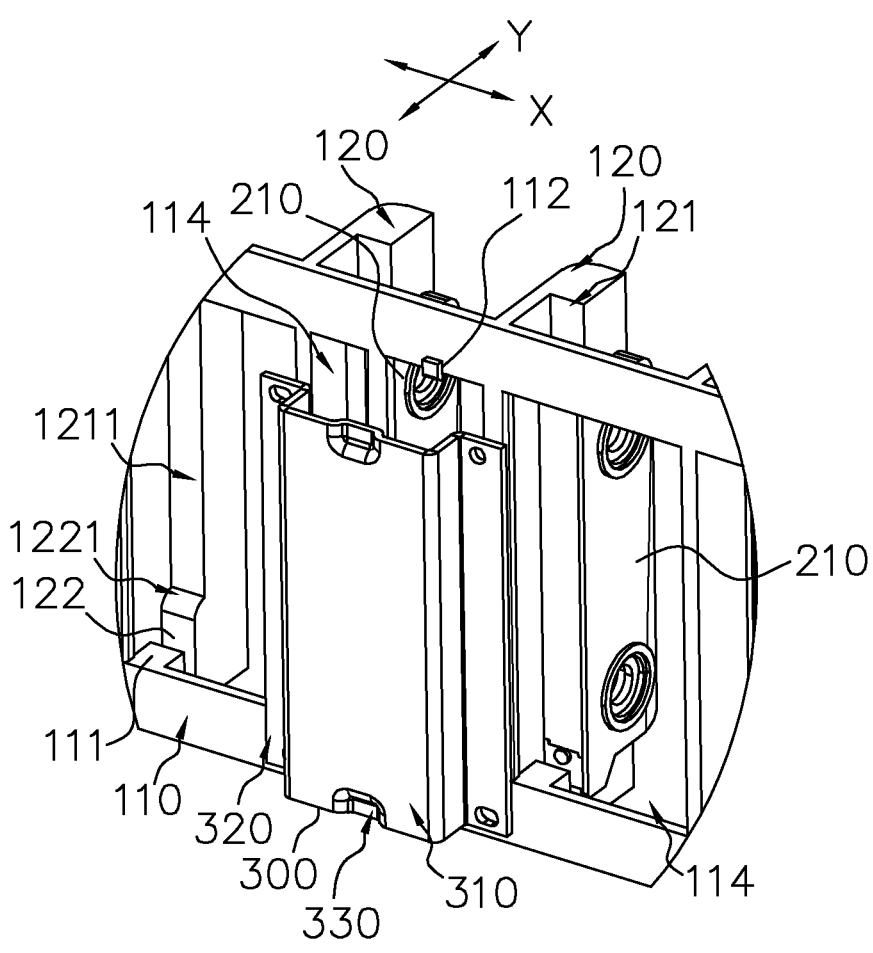
FIG. 14 is a partial structural view of FIG. 13.

Referring to FIG. 12 to FIG. 14, based on the design that the main body portion 110 is provided with the engagement protrusion 112, in an embodiment of the present disclosure, the busbar 300 (e.g., but not limited to, the main body 310) may be provided with an engagement slot 330. Accordingly, the engagement protrusion 112 of the main body portion 110 may be engaged with the engagement slot 330 by engaging with each other. Through the above design, the present disclosure may further improve the assembly stability and assembly precision of the busbar 300.

As shown in FIG. 1 and FIG. 2, in an embodiment of the present disclosure, the main body portion 110 may have a frame structure and have an opening, and a position-limiting plate 113 is disposed in the opening. The position-limiting plate 113 occupies part of the space of the opening, and part of the opening not occupied by the position-limiting plate 113 forms the through hole 114. Accordingly, referring to FIG. 6 to FIG. 9, when the busbar 300 is disposed on the busbar support 100, the main body 310 of the busbar 300 is located on one side of the position-limiting plate 113 facing away from the protection portion 120. The connection portion 320 of the busbar 300 passes through the through hole 114 and is located on one side of the main body portion 110 where the protection portion 120 is provided, so that the connection portion 320 and the pole assembly 210 may be connected. Through the above design, the present disclosure may simplify the structure complexity, provide an effective insulation function, and prevent the welding slag from splashing during the welding process of the busbar 300.

As shown in FIG. 1, based on the design that the main body portion 110 has the through hole 114 through which the connection portion 320 of the busbar 300 passes, in an embodiment of the present disclosure, the hole wall 1141 of the through hole 114 may be provided with a position-limiting protrusion 115, which is used to limit the position of the connection portion 320 of the busbar 300. Referring to FIG. 6 to FIG. 9, when the busbar 300 is disposed on the busbar support 100, the connection portion 320 of the busbar 300 is limited to one side of the position-limiting protrusion 115 facing the batteries 200. Through the above design, the present disclosure may utilize the position-limiting protrusion 115 to ensure the fixing of the busbar 300, and has a simple structure, easy configuration, and convenient processing.

Figure 10:
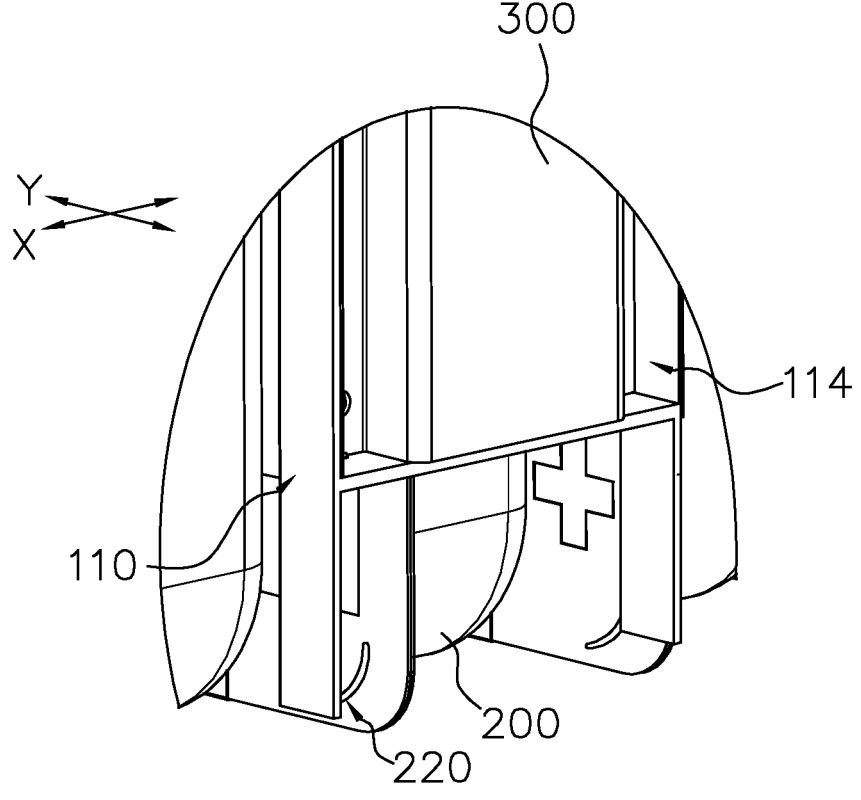
FIG. 10 is a partial perspective structural view of the battery pack shown in FIG. 6 from another angle.

Referring to FIG. 10, FIG. 10 schematically shows a partial three-dimensional structure of the busbar support 100 assembled on the lateral surface of the batteries 200 from another angle. An explosion-proof valve 220 of the batteries 200 is located at the bottom and/or the top of the surface of one side of the batteries 200 along the first direction X (consider that the batteries 200 are respectively provided with explosion-proof valves 220 at the diagonal positions of the surface of the side, such as the "upper left corner" and "lower right corner" of the surface of the side). On this basis, in an embodiment of the present disclosure, when the busbar support 100 is arranged on the lateral surface of the batteries 200, a part of the structure of the busbar support 100 may be located on one side of the explosion-proof valve 220 along the first direction X. For example, as shown in FIG. 10, the main body portion 110 partially extends downward to one side of the explosion-proof valve 220 along the first direction X, that is, on the surface of one side of the batteries 200 along the first direction X. The orthographic projection of the busbar support 100 at least partially overlaps the orthographic projection of the explosion-proof valve 220. In some embodiments, the protection portion 120 of the busbar support 100 may also be appropriately extended (in the height direction), so that the protection portion 120 may cover the explosion-proof valve 220 of the batteries 200 when being assembled in the battery pack. Through the above design, the present disclosure may use the busbar support 100 to block the heat flow ejected when the explosion-proof valve 220 is depressurized, thereby improving the safety performance of adjacent batteries 200.

Referring to FIG. 4 and FIG. 5, FIG. 4 schematically shows a three-dimensional structure of the busbar support 100 of a battery pack in another embodiment that can embody the principles of the present disclosure; FIG. 5 schematically shows a partial top view of the busbar support 100 shown in FIG. 4.

As shown in FIG. 4 and FIG. 5, in an embodiment of the present disclosure, the busbar support 100 may include a main body portion 110 and a plurality of protection portions 120. Accordingly, referring to FIG. 11 to FIG. 14, the busbar support 100 may be arranged on the lateral surface of the battery string, and the busbar support 100 may be arranged for a plurality of busbars 300 through a main body portion 110, and provide protection for the pole assembly 210 of the plurality of batteries 200 through the plurality of protection portions 120 respectively. Through the above design, the present disclosure may reduce the number of busbar supports 100 when the battery pack includes a battery string composed of multiple batteries, simplify the assembly process of the busbar support 100 and the battery string, and improve the assembly efficiency.

It should be noted that, compared with the embodiments shown in FIG. 1 to FIG. 3, in the embodiments shown in FIG. 4 and FIG. 5, the difference between them only lies in the number of busbars 300 that can be provided in the main body portion 110 of the busbar support 100, specifically the difference between one and multiple. On this basis, the busbar support 100 of the battery pack provided by the present disclosure is substantially in the form of a unit member in the embodiments shown in FIG. 1 to FIG. 3, that is, each such unit member may be provided for placing one busbar 300 for the one busbar 300 to be connected to pole assemblies 210 of one or two batteries 200. In the meantime, the one or two protection portions 120 are used to provide protection for each pole assembly 210. Correspondingly, the busbar support 100 of the battery pack provided by the present disclosure is substantially in the form of an integral member in the embodiments shown in FIG. 4 and FIG. 5, and the integral member may also be construed as an integral structure formed by the main body portions 110 of a plurality of the above-mentioned unit members connected together. That is, such an integral member may be provided for placing a plurality of busbars 300, so that the plurality of busbars 300 are respectively connected with the pole assemblies 210 of the plurality of batteries 200. Specifically, each busbar 300 may be connected to the pole assemblies 210 of two adjacent batteries 200 respectively, while a plurality of protection portions 120 are utilized to protect the plurality of pole assemblies 210.

In addition, for example, other preferred designs in the various embodiments shown in FIG. 1 to FIG. 5, such as the dimensional relationship between the groove 121 and the pole assembly 210, the first protrusion 122 and its related preferred designs, the design of reinforcing rib 123, the second protrusion 111, the engagement protrusion 112, the opening of the main body portion 110 and the position-limiting plate 113, the position-limiting protrusion 115, the design for shielding the explosion-proof valve 220, etc., may all be applied to any embodiments shown in FIG. 1 to FIG. 5, or in various possible embodiments in line with the design concept of the present disclosure, no matter in the form of "unit member" or "integral member".

It should be noted here that the busbar supports shown in the drawings and described in this specification are but a few examples of the many types of busbar supports that can employ the principles of the present disclosure. It should be clearly understood that the principles of the disclosure are by no means limited to any detail or any component of the busbar support shown in the drawings or described in this specification.

Referring to FIG. 6, FIG. 6 is a schematic diagram of the three-dimensional structure of the battery pack provided by the present disclosure. In this exemplary embodiment, the battery pack provided by the present disclosure is described as being applied to a vehicle-mounted battery as an example. Those skilled in the art can easily understand that, in order to apply the related design of the present disclosure to other types of battery devices, various modifications, additions, substitutions, deletions or other changes can be made to the following specific embodiments. Variations are still within the scope of the principles of the battery pack provided by the present disclosure.

Figure 9:
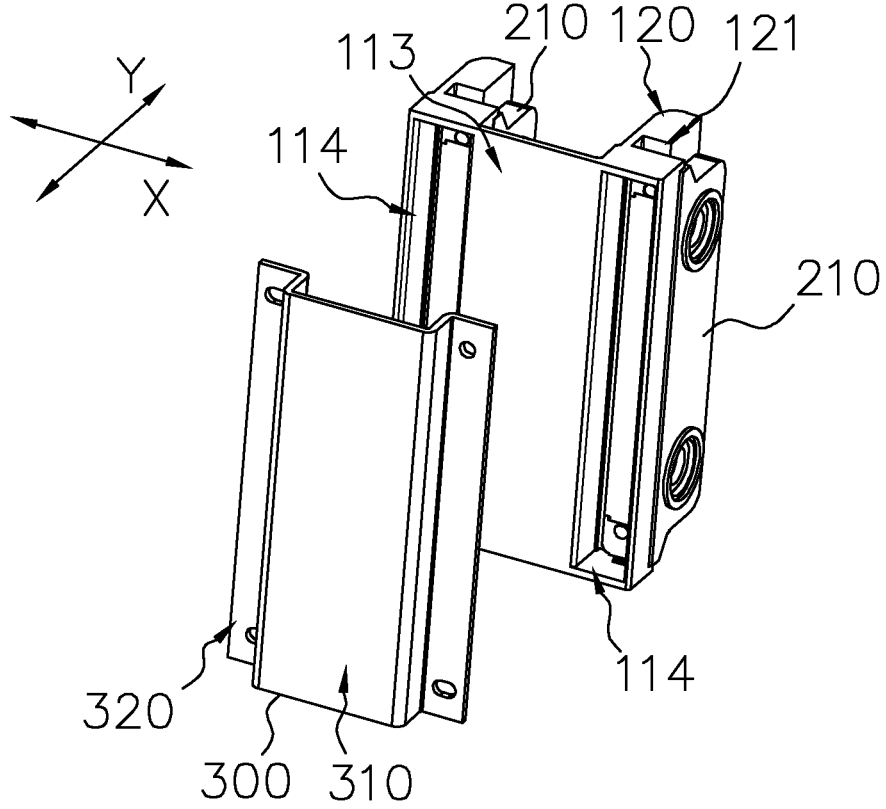
FIG. 9 is a partial structural view of FIG. 8.

As shown in FIG. 6, in an embodiment of the present disclosure, the battery pack provided by the present disclosure includes batteries 200, a busbar support 100 and a busbar 300. Referring to FIG. 7 to FIG. 9, FIG. 7 schematically shows a partial top view of the battery pack; FIG. 8 schematically shows a partial perspective exploded view of the battery pack, which specifically shows a three-dimensional structure of the busbar 300 after moving by a distance along the second direction Y. For clarity of illustration, only one battery 200 is shown. FIG. 9 is a schematic view of a part of the structure of FIG. 8, which specifically shows a structure in which the batteries 200 are removed and the pole assembly 210 thereof is retained. The structure, connection manner and functional relationship of each main component of the battery pack provided by the present disclosure will be described in detail below with reference to the above drawings.

As shown in FIG. 6 to FIG. 9, in an embodiment of the present disclosure, the battery pack provided by the present disclosure includes the busbar support 100 provided by the present disclosure and described in detail in the above embodiment, and the busbar support 100 is exemplified as the busbar support 100 shown in FIG. 1 to FIG. 3. Specifically, the battery pack includes a battery string, the battery string includes a plurality of batteries 200 arranged along the first direction X, and a recessed region 201 is formed on the lateral surface of the battery string between two adjacent batteries 200. The pole assembly 210 of one of the batteries 200 is located in the recessed region 201, and a plurality of recessed regions 201, one less than that of the plurality of batteries 200, are formed on the lateral surface of the battery string. On this basis, a plurality of busbar supports 100 are provided on the lateral surface of the battery string. For each busbar support 100, the main body portion 110 is configured to provide one busbar 300, and there are two protection portions 120, and the two protection portions 120 are respectively accommodated in two adjacent recessed regions 201.

Referring to FIG. 11 to FIG. 14, FIG. 11 schematically shows a schematic three-dimensional structure of a battery pack that can embody the principles of the present disclosure in another embodiment; FIG. 12 schematically shows a partial top view of the battery pack; FIG. 13 schematically shows a partial three-dimensional exploded view of the battery pack, which specifically shows a three-dimensional structure of the busbar 300 after moving by a distance along the second direction Y, and for clarity of illustration, only one battery 200 is shown; FIG. 14 is a schematic view of a part of the structure of FIG. 12, which specifically shows the structure in which the batteries 200 are removed and the pole assembly 210 thereof is retained.

As shown in FIG. 11 to FIG. 14, in an embodiment of the present disclosure, the battery pack provided by the present disclosure includes the busbar support 100 provided by the present disclosure and described in detail in the above embodiment, and the busbar support 100 is exemplified as the busbar support 100 shown in FIG. 4 and FIG. 5. Specifically, the main body portion 110 of the busbar support 100 is used for placing a plurality of busbars 300, and the busbar support 100 includes a plurality of protection portions 120, and the plurality of protection portions 120 are respectively accommodated in the plurality of recessed regions 201.

Continuing from the above, in accordance with various possible implementations of the battery pack provided by the present disclosure, the battery pack provided by the present disclosure may include batteries 200 and the busbar support 100 provided by the present disclosure. The busbar support 100 is arranged on the lateral surface of the batteries 200, and configured for placing the busbar 300. The busbar 300 is connected to the pole assembly 210 of the batteries 200.

It should be noted here that the battery packs shown in the drawings and described in this specification are but a few examples of the many types of battery packs that can employ the principles of the present disclosure. It should be clearly understood that the principles of the present disclosure are in no way limited to any detail or any component of the battery pack shown in the drawings or described in this specification.

To sum up, the busbar support 100 of the battery pack provided by the present disclosure includes a main body portion 110 and a protection portion 120. The main body portion 110 is used to place the busbar 300, and the protection portion 120 is connected to one side of the main body portion 110. When the busbar support 100 is arranged on the lateral surface of the batteries 200, the protection portion 120 is located on one side of the pole assembly 210 facing away from the batteries 200, so as to provide protection for the pole assembly 210. Through the above design, the present disclosure may use the protection portion 120 to provide protection for the pole assembly 210 of the batteries 200 while the busbar 300 is fixed, which facilitates to improve the stability and reliability of the battery pack.

Based on the above detailed descriptions of various embodiments of the battery pack provided by the present disclosure, several exemplary embodiments of the assembly method of the battery pack provided by the present disclosure will be illustrated below.

Directed at the specific groove 121 of the protection portion 120 and the busbar support 100 provided with the first protrusion 122 on the groove wall 1211 of the groove 121, an assembly method of a battery pack provided by the present disclosure may be used to assemble the batteries 200 and the busbar support 100 provided by the present disclosure. In an embodiment of the present disclosure, the assembly method specifically includes:

Using a tool to fix the busbar support 100;

Placing the batteries 200 from top to bottom, so that the lower end of the pole assembly 210 of the batteries 200 is engaged between the first protrusion 122 and the main body portion 110.

Through the above design, the assembly method of the battery pack provided by the present disclosure may limit the position of the lower end of the pole assembly 210 of the placed batteries 200 through the first protrusion 122 during the process of placing the batteries 200 from top to bottom. In particular, when the first protrusion 122 has a chamfered structure 1221, the chamfered structure 1221 may be used to guide the pole assembly 210, so that the configuration of the batteries 200 is easier and the assembly precision is higher.

For the busbar support 100 (i.e., in the form of the above-mentioned integral member) that may be provided with multiple busbars 300 in the main body portion 110, an assembly method of a battery pack provided by the present disclosure may be used to assemble the batteries 200 and the busbar support 100 provided by the present disclosure. In an embodiment of the present disclosure, the assembly method specifically includes:

Using a tool to fix multiple batteries 200 into a battery string;

Loading the busbar support 100 from top to bottom relative to the battery string, and the pole assembly 210 of the batteries 200 is at least partially accommodated in the groove 121, and then the busbar support 100 is pushed toward the battery string, so that part of the structure of the pole assembly 210 is engaged in the positioning groove 116.

Through the above design, the assembly method of the battery pack provided by the present disclosure may assemble the busbar support 100 provided with a plurality of busbars 300 to the lateral surface of the battery string at one time. The assembly method of the present disclosure has high assembling efficiency, simple configuration, and convenient operation, which facilitates to save labor or realize automated assembly.

It should be noted here that the assembly methods for battery pack shown in the drawings and described in this specification are but a few examples of the many assembly methods that can employ the principles of the present disclosure. It should be clearly understood that the principles of the present disclosure are by no means limited to any detail or any step of the method of assembling a battery pack shown in the drawings or described in this specification.

Exemplary embodiments of the battery pack and the method for assembling the battery pack provided by the present disclosure are described and/or illustrated in detail above. However, embodiments of the present disclosure are not limited to the specific embodiments described herein, but rather, components and/or steps of each embodiment may be used independently and separately from other components and/or steps described herein. Each component and/or each step of one embodiment may also be used in combination with other components and/or steps of other embodiments. When introducing elements/components/etc. described and/or illustrated herein, the terms "a," "an," "above," and the like are used to mean that there are one or more of the elements/components/etc. The terms "comprising", "including" and "having" are used to indicate an open-ended inclusive meaning and mean that there may be additional elements/components/etc. in addition to the listed elements/components/etc. In addition, the terms "first" and "second" and the like in the claims and the description are used only as labels, not as numerical limitations on their objects.

Other embodiments of the disclosure will be apparent to those skilled in the art from consideration of the specification and practice of the disclosure disclosed herein. The disclosure is intended to cover any variations, uses or adaptations of the disclosure. These variations, uses, or adaptations follow the general principles of the disclosure and include common general knowledge or conventional technical means in the art that are not disclosed in the present disclosure. The specification and embodiments are illustrative, and the real scope and spirit of the present disclosure is defined by the appended claims.

It should be understood that the disclosure is not limited to the precise structures that have been described above and shown in the drawings, and various modifications and variations can be made without departing from the scope thereof. The scope of the disclosure is limited only by the appended claims.

What is claimed is:

1. A battery pack, comprising a battery string and a busbar support, wherein the battery string comprises a plurality of batteries arranged along a first direction, a surface of each of the batteries perpendicular to the first direction is provided with a pole assembly, the busbar support is arranged on a surface of each of the batteries parallel to the first direction; the busbar support comprises a main body portion and a protection portion, the main body portion is configured for setting a busbar, the protection portion is connected to one side of the main body portion, the protection portion is located on one side of the pole assembly facing away from each of the batteries-along the first direction, so as to provide protection for the pole assembly, wherein a recessed region is formed on the surface of the battery string parallel to the first direction, and the recessed region is located between two batteries of the batteries adjacent to each other, and the pole assembly of one battery of the batteries is located in the recessed region;

wherein the protection portion is accommodated in the recessed region between adjacent batteries and located between the pole assembly of the one battery and another battery of the batteries adjacent to the one battery.

2. The battery pack according to claim 1, wherein the surface of each of the batteries perpendicular to the first direction is a first surface, and the protection portion is located between the two first surfaces of two batteries of the batteries adjacent to each other and the two first surfaces facing each other.

3. The battery pack according to claim 1, wherein the pole assembly has a first portion and a second portion, the first portion is disposed on the surface of each of the batteries perpendicular to the first direction and is configured for connecting with a tab of each of the batteries, the second portion is connected to the first portion and extends along the first direction for connecting the busbar; wherein the protection portion is at least located on one side of the second portion facing away from each of the batteries along the first direction, so as to provide protection for the second portion.

4. The battery pack according to claim 1, wherein the busbar support is provided with a groove, and the groove is jointly formed by the main body portion and the protection portion, the groove is configured to accommodate the pole assembly and a connection portion of the busbar, and a size of the groove is larger than a size of the pole assembly.

5. The battery pack according to claim 4, wherein a notch of the groove is opened toward the pole assembly along the first direction, so that the pole assembly is able to enter the groove through the notch.

6. The battery pack according to claim 5, wherein the groove has a first groove wall and a second groove wall spaced apart along a second direction, and the second direction is perpendicular to the first direction, the first groove wall is located on a surface of the main body portion facing the battery, and the second groove wall is located on the protection portion, the second groove wall is provided with a first elastic member extending toward the first groove wall, and the pole assembly is sandwiched between the first elastic member and the first groove wall, and the first elastic member is configured for providing an elastic preload force to the pole assembly.

7. The battery pack according to claim 6, wherein an upper side and/or a lower side of the first elastic member is provided with a guiding structure, the guiding structure is an inclined surface structure and configured for guiding the pole assembly when the battery pack and the busbar support move up and down relative to each other so that the pole assembly enters the groove.

8. The battery pack according to claim 6, wherein the second groove wall is provided with at least two first elastic members, and the at least two first elastic members are arranged at intervals.

9. The battery pack according to claim 6, wherein the first elastic member is a spring or an elastic sheet.

10. The battery pack according to claim 6, wherein the first elastic member and the protection portion are integrally formed.

11. The battery pack according to claim 6, wherein the pole assembly is provided with a position-limiting member, which is configured to limit a position of the first elastic member.

12. The battery pack according to claim 6, wherein an insulating adhesive layer is disposed on a surface of the pole assembly, and the insulating adhesive layer has an opening corresponding to a position of the first elastic member is configured for accommodating the first elastic member.

13. The battery pack according to claim 6, wherein an insulating adhesive layer is provided on a surface of the pole assembly, and the insulating adhesive layer is provided with a position-limiting member, the position-limiting member is configured to limit a position of the first elastic member.

14. The battery pack according to claim 6, wherein the first groove wall is provided with a positioning groove, and the positioning groove is configured to accommodate and fasten a part of a structure of the pole assembly.

15. A method for assembling the battery pack of claim 14, comprising: using a tool to fix the plurality of batteries into the battery string; loading the busbar support from top to bottom relative to the battery string, and the pole assembly of the battery is at least partially accommodated in the groove, and then the busbar support is pushed toward the battery string, so that a part of a structure of the pole assembly is engaged in the positioning groove.

16. The battery pack according to claim 4, wherein a lower end of the groove facing a groove wall of the main body portion is provided with a first protrusion, the first protrusion is spaced apart from the main body portion along a second direction perpendicular to the first direction; wherein when the busbar support is arranged on a lateral surface of the battery, a lower end of the pole assembly is engaged between the first protrusion and the main body portion.

17. The battery pack according to claim 16, wherein:

an upper end of one side of the first protrusion facing the main body portion is provided with a chamfer structure; and/or the main body portion is provided with a second protrusion protruding toward the first protrusion, the first protrusion is arranged at intervals from the second protrusion; wherein when the busbar support is arranged on the lateral surface of the battery, a lower end of the pole assembly is engaged between the first protrusion and the second protrusion.

18. A method for assembling the battery pack of claim 17, comprising: fixing the busbar support with a tool; placing the battery from top to bottom, so that a lower end of the pole assembly of the battery is engaged between the first protrusion and the main body portion.

19. A method for assembling the battery pack of claim 16, comprising: fixing the busbar support with a tool; placing the battery from top to bottom, so that a lower end of the pole assembly of the battery is engaged between the first protrusion and the main body portion.

20. The battery pack according to claim 4, wherein the main body portion is frame-shaped and has an opening, and a position-limiting plate is disposed in the opening, the position-limiting plate occupies a part of a space of the opening, and a part of the opening not occupied by the position-limiting plate forms a through hole, and the through hole communicates with the groove; wherein when the busbar is disposed on the busbar support, a main body of the busbar is located on one side of the position-limiting plate facing away from the protection portion, the connection portion passes through the through hole and is connected to the pole assembly accommodated in the groove.

21. The battery pack according to claim 1, wherein the protection portion is slidably disposed on the main body portion, and a sliding direction of the protection portion is the first direction.

22. The battery pack according to claim 21, wherein a slide rail is provided on one side of the main body portion facing the battery pack, the protection portion is slidably cooperated with the slide rail.

23. The battery pack according to claim 1, wherein the busbar support further comprises a connecting portion having a reduced thickness relative to the main body portion and the protection portion, and the main body portion and the protection portion are connected through the connecting portion.

24. The battery pack according to claim 23, wherein the main body portion, the protection portion and the connecting portion are formed as an integral structure.

25. The battery pack according to claim 23, wherein one side of the protection portion facing away from the pole assembly is provided with a second elastic member facing the adjacent battery; or one side of the protection portion facing the pole assembly is provided with a second elastic member facing the battery where the pole assembly is located.

26. The battery pack according to claim 25, wherein the second elastic member is a cantilever structure, and a connection end of the cantilever structure is connected to the protection portion, a free end of the cantilever structure abuts against the adjacent battery.

27. The battery pack according to claim 25, wherein the second elastic member and the protection portion are formed as an integral structure.

28. The battery pack according to claim 1, wherein the protection portion is connected to the main body portion in a detachable manner.

29. The battery pack according to claim 1, wherein the main body portion is provided with an engagement protrusion, and the main body portion is engaged with the busbar through the engagement protrusion.

30. The battery pack according to claim 29, wherein the busbar is provided with an engagement slot, and the engagement protrusion cooperates with the engagement slot by engaging with each other.

31. The battery pack according to claim 1, wherein the main body portion has a frame structure and has an opening, and a position-limiting plate is disposed in the opening, the position-limiting plate occupies a part of a space of the opening, and a part of the opening not occupied by the position-limiting plate forms a through hole; wherein when the busbar is disposed on the busbar support, a main body of the busbar is located on one side of the position-limiting plate facing away from the protection portion, a connection portion of the busbar passes through the through hole and is located on one side of the main body portion where the protection portion is provided.

32. The battery pack according to claim 31, wherein a hole wall of the through hole of the main body portion is provided with a position-limiting protrusion, which is configured to limit a position of the connection portion of the busbar.

33. The battery pack according to claim 1, wherein an explosion-proof valve of the battery is located at a bottom and/or a top of a surface of one side of the battery along the first direction; wherein when the busbar support is arranged on a lateral surface of the battery, an orthographic projection of the busbar support at least partially overlaps an orthographic projection of the explosion-proof valve on the surface of the one side of the battery along the first direction.

34. The battery pack according to claim 1, wherein the battery string comprises at least three of the batteries; wherein the busbar support is configured to set one busbar, and the busbar support comprises two protection portions, the two protection portions are arranged at intervals along the first direction, the two protection portions are respectively accommodated in two recessed regions adjacent to each other.

35. The battery pack according to claim 1, wherein the battery string comprises the plurality of batteries, and a plurality of recessed regions, one less than the plurality of batteries, are formed on a lateral surface of the battery string; wherein the busbar support is configured to set a plurality of busbars, and comprises a plurality of protection portions which are the same as the recessed regions in number, the plurality of protection portions are arranged at intervals along the first direction, and the plurality of protection portions are respectively accommodated in the plurality of recessed regions.

36. The battery pack according to claim 1, wherein there is a gap between the protection portion and the battery on one side facing away from the pole assembly.

37. The battery pack according to claim 1, wherein:

at least four recessed regions are provided on one side of the battery string, and at least one busbar support is provided on one lateral surface of the battery string, the main body portion is configured to set at least two busbars, and the busbar support comprises at least four protection portions, and the at least four protection portions are respectively accommodated in the at least four recessed regions; or one side of the battery string is provided with at least four recessed regions, and the one lateral surface of the battery string is provided with at least two busbar supports, for each of the busbar supports, the main body portion is configured to set one busbar, and there are two protection portions, and the two protection portions are respectively accommodated in two recessed regions adjacent to each other.

38. The battery pack according to claim 1, wherein the recessed region is arc-shaped, one side of the protection portion facing away from the pole assembly is in an arc shape corresponding to a shape of a partial area of the recessed region.

39. The battery pack according to claim 38, wherein a surface of the protection portion facing away from the pole assembly is provided with a reinforcing rib, one side of the reinforcing rib facing away from the pole assembly is in the arc shape corresponding to the shape of the partial area of the recessed region.

* * * * *